March 16, 1965

J. L. ENGLE 3,173,983

ARC POSITIONING SERVO

Filed Jan. 2, 1962

INVENTOR
James L. Engle
BY
ATTORNEYS

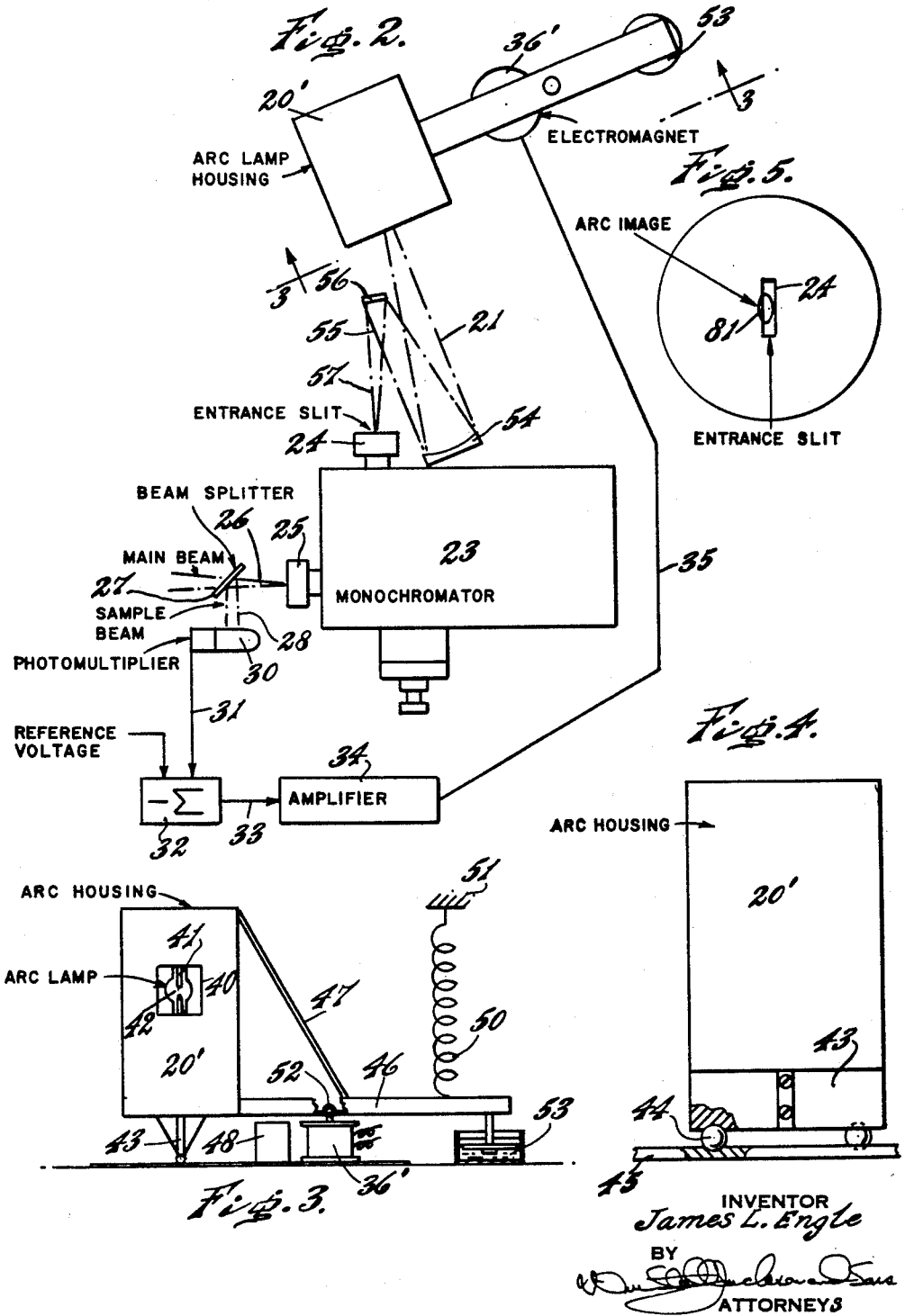

March 16, 1965 J. L. ENGLE 3,173,983
ARC POSITIONING SERVO
Filed Jan. 2, 1962 3 Sheets-Sheet 3

INVENTOR
James L. Engle
BY
ATTORNEYS

United States Patent Office 3,173,983
Patented Mar. 16, 1965

3,173,983
ARC POSITIONING SERVO
James L. Engle, New Lisbon, N.J., assignor, by mesne assignments, to the United States of America as represented by the United States Atomic Energy Commission
Filed Jan. 2, 1962, Ser. No. 163,588
3 Claims. (Cl. 88—14)

The present invention relates to optical devices and particularly to servo mechanisms for positioning a source of light, particularly an arc lamp, in preferential or optimal alignment with an optical device.

A purpose of the invention is to increase the output from an optical device such as a monochromator.

A further purpose is to prevent diminution in the light passing through a monochromator by wandering of the source of light, particularly by wandering of an arc over its electrodes.

A further purpose is to pass an optical beam from a source of light, preferably an arc lamp, through an optical device such as a monochromator, to introduce a beam splitter in the path of the beam beyond the monochromator and thus to produce a subsidiary beam, to receive the subsidiary beam on a photo responsive device such as a phototube and thus create an electrical output which is responsive to the intensity of the subsidiary beam and, therefore, responsive to the intensity of the beam itself, and then to control the position of the source of light in response to the electrical output from the photo responsive device.

A further purpose is to manipulate the source of light by solenoid means which responds to the difference between the output of the photo responsive device and a reference voltage, said difference being suitably amplified.

A further purpose is to automatically position an arc lamp so that changes in the lateral position of the arc between its electrodes will not change the amount of light entering and leaving an optical device such as a monochromator.

A further purpose is to permit the use of a geometrically very narrow source of light having a width of the same order of magnitude as the entrance slit of an optical system, and to prevent variation in intensity of illumination by automatically orienting the source of light to maintain it in alignment with the slit.

A further purpose is to reposition the source of light until the output of a phototube equals a reference voltage.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 2 is a plan view of a device according to the invention showing a particular construction of the electromagnet servo mechanism, and the monochromator, the associated circuit being illustrated diagrammatically.

FIGURE 3 is a side view of the electromagnet servo mechanism and arc lamp housing of FIGURE 2, illustrated in the direction shown by the line 3—3 of FIGURE 2.

FIGURE 4 is an end view of the arc lamp housing and its bearing mounting illustrated in FIGURES 2 and 3.

FIGURE 5 is an enlarged diagram showing the arc lamp slit and the position of the arc image at the time correct positioning has been obtained.

In the operation of optical systems where precise alignment of the light beam is required, such as monochromators which for example produce a beam of light which is intended to be used in any of a wide variety of optical devices, including the ultraviolet microscope, and especially in narrow slit optical systems where the image of the light source is so narrow that it is of the same order of magnitude as the slit, there is danger that the alignment between the light source and the optical system may be lost and the intensity of the illumination will vary or diminish. This is particularly so when an electric arc is used as a source of light, since the arc may wander over the electrodes or lose its alignment.

The present invention contemplates precise control of the alignment of the source of light such as an arc lamp, so that wandering by the arc will no longer cause marked variation in the intensity of the light beam.

Figure 1:
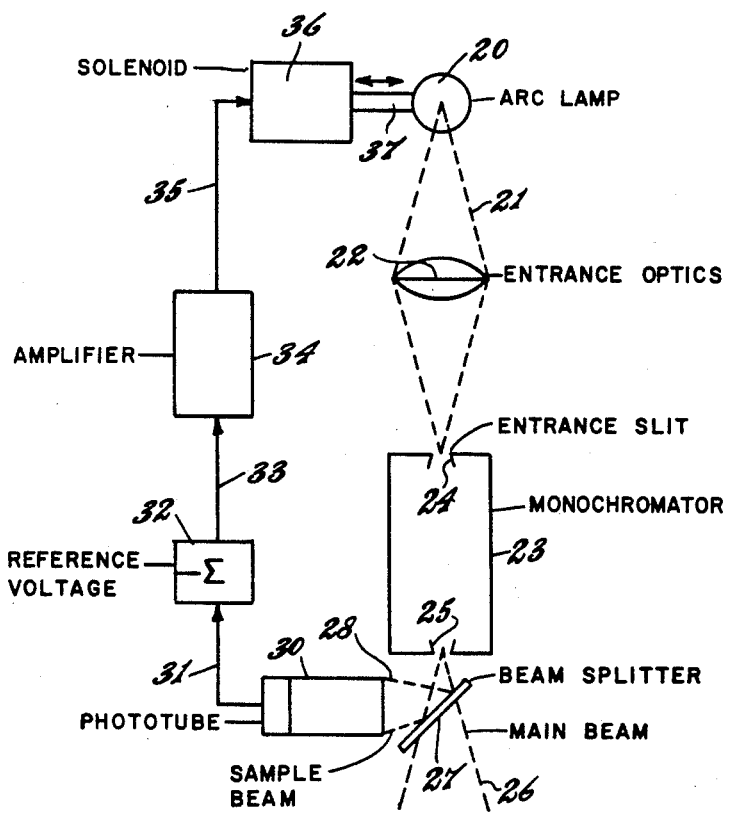
FIGURE 1 is a diagrammatic illustration of a light source positioning servo according to the present invention.

According to the invention, as shown in FIGURE 1, a light source 20 which in the preferred embodiment will be an arc lamp having electrodes, creates a light beam 21 which passes through an optical device, in this case shown conventionally as entrance optics 22, and a monochromator 23 having an entrance slit 24 and an exit slit 25. An exit light beam 26 from the monochromator passes to a suitable optical mechanism, not shown.

In accordance with the invention the exit light beam passes through a beam splitter 27 which may suitably be a quartz microscope slide placed at a suitable angle to the main beam. The beam splitter creates an auxiliary beam 28 which will contain a small percent typically only about 5% of the energy of the main beam and will reflect this auxiliary beam at an angle to the main beam.

The auxiliary beam is received by an electro-optical device, suitably a phototube 30, which creates an electrical output 31 responsive to the intensity of the auxiliary beam 28, which is in turn responsive to the intensity of the main beam since the auxiliary beam is proportional to the main beam.

The electrical output 31 is fed into a comparison device 32 which compares it with a reference voltage, suitably a source of reference D.C. voltage, and the electrical output constituting the difference is passed through electrical channel 33, amplifier 34 and electrical channel 35 to form the input of solenoid 36 which has an armature 37 suitably mounting and manipulating the arc lamp 20.

The solenoid will preferably be spring biased in one direction and magnetically urged in the opposite direction.

In operation of the device as shown in FIGURE 1, it will automatically position the arc lamp by laterally shifting its position to correctly align the electrodes of the arc lamp with the axis of the monochromator or other optical system.

The alignment will take place until the output voltage of the phototube almost exactly equals the reference voltage, and adjustment of the position of alignment can be accomplished by adjusting the reference voltage as well known. Typically the image of the arc will be aligned with the slit in such a way as to permit 90% of the light to enter that would enter if the image were perfectly centered.

Thus a very narrow arc having a width approximately the same as the width of the entrance slit 24 of the monochromator can be used and yet this narrow source of light can be kept aligned with the axis of the monochromator, once it is initially set by adjusting the reference voltage.

The beam splitter in effect takes a sample of the light output of the beam at the exit slit and compares a voltage responsive to this light output with the reference voltage to produce a difference or error voltage which operates the solenoid to reposition the arc lamp to the position for optimum illumination.

Thus, the source of light is automatically maintained in a position which is nearly optimum as far as alignment with the entrance slit 24 is concerned.

Considering the illustration of FIGURES 2 to 4, inclusive, the arc lamp housing 20' mounts an illuminator window 40 and electrodes 41 which produce an arc 42.

The housing is mounted on a support 43 which carries at the lower ends suitable sockets for bearings, conveniently steel balls 44, mounted on a base 45 and suitably resting in sockets in the base.

The housing 20' mounts a magnetically susceptible armature 46 by means of a brace 47, and the armature cooperates with an electromagnet 36' which has a pole piece 48 connected by a magnetic circuit with the core of the electromagnet, and operatively arranged to attract the armature 46 when the electromagnet 36' is energized.

The combination of the armature 46 and the arc lamp housing 20' is spring biased away from the electromagnet by a helical tension spring 50 operating from a spring abutment 51, and the armature is limited in its motion away from the pole piece 48 by an adjustable stop 52, suitably a bolt, extending through an opening in the armature, and adjustably mounted in the electromagnet core.

The motion of the arc lamp housing and the armature in either direction is damped by a dash pot 53 suitably provided with a viscous liquid medium such as a heavy oil.

The optical system, as shown in FIGURE 2, conveniently provides a light beam 21 from the arc lamp which is projected upon a slightly angularly disposed concave mirror 54 which projects a reflected beam 55 on mirror 56 which in turn projects a reflected beam 57 on entrance slit 24 of monochromator 23 which has an exit slit 25 projecting a main beam 26 which is partially reflected by beam splitter 27 to form a sample beam 28 which enters phototube 30.

Figure 6:
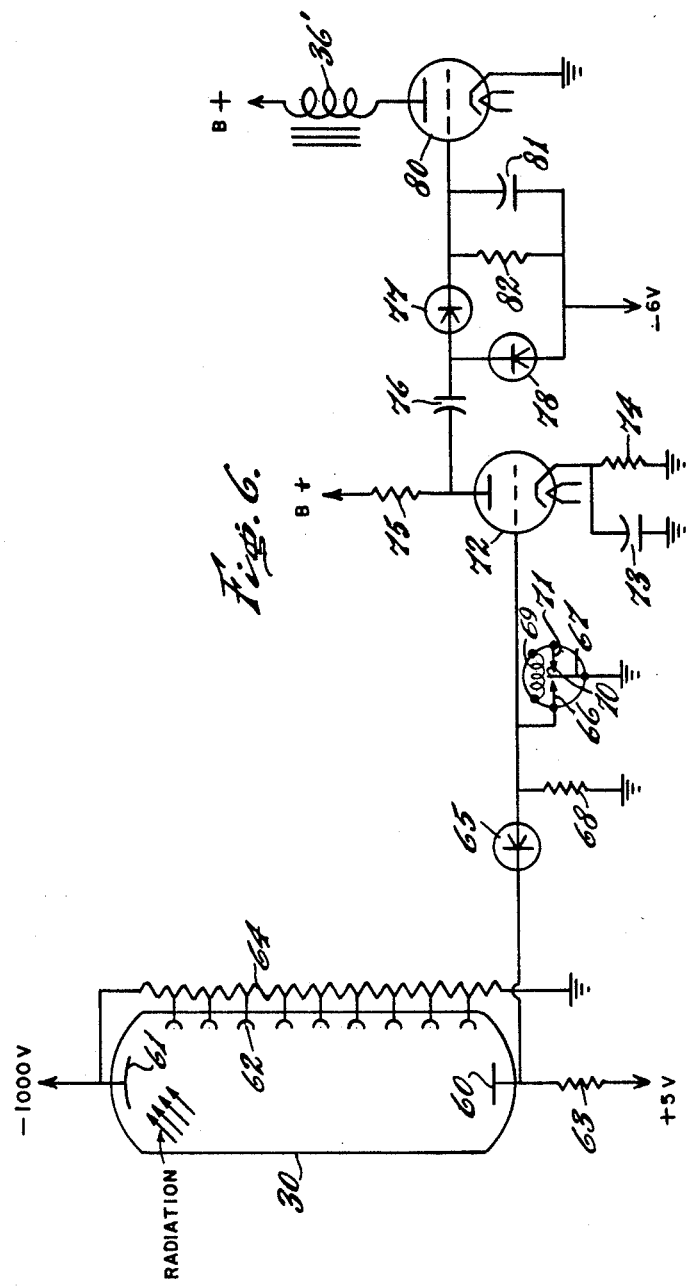
FIGURE 6 is a circuit diagram illustrating one servo circuit which will desirably be employed in the device of the invention.

The detail of a suitable electric circuit beginning at the phototube is best seen in FIGURE 6. The phototube 30 as there shown, has an anode 60, a cathode 61 and a suitable number, for example nine, dynodes 62. The anode is connected to a suitable standard source of positive voltage, for example plus 5 volts, through a resistor 63. The cathode is connected to a suitable negative voltage, for example minus 1000 volts, and the dynodes are connected at various points to a voltage divider 64 connected at one end to the anode and at the other end to ground.

The anode 60 is connected to the cathode of diode 65, the anode of the diode being connected to one of the fixed terminals 66 of chopper 67, and also to ground through the resistor 68. The armature 70 of the chopper is grounded and the opposite fixed element 71 is unconnected so that in effect the chopper either grounds the anode of diode 65 or leaves it ungrounded. The chopper drive is shown at 69.

The anode of diode 65 is connected to the control grid of amplifier vacuum tube 72, which is conveniently of a heater type, having its cathode grounded through an A.C. bypass capacitor 73 and through biasing resistor 74. The anode of the amplifier is connected to a source of B voltage through a load resistor 75 and is also connected through coupling capacitor 76 to a diode pump circuit, having diodes 77 and 78 connected in opposite branches. Diode 77 has its anode connected on the side toward the anode of amplifier tube 72 and is connected at the cathode side to the control grid of power amplifier vacuum tube 80. Diode 78 has its cathode connected to the side adjoining the anode of amplifier 72 and has its anode connected to a suitable negative voltage source, for example at minus 6 volts. Connected in shunt across to the source of negative voltage from the cathode side of diode 77 in separate branches are storage capacitor 81 and load resistor 82.

The power amplifier tube 80 has its cathode grounded and has its anode connected to one side of solenoid 36' previously described, the opposite side of the solenoid being connected to a suitable source of B voltage.

In operation of the circuit, it will be evident that the D.C. reference voltage is plus 5 volts in the particular circuit. When the negative contribution from the photomultiplier begins to exceed 5 volts, the net voltage at the anode 60 of the photomultiplier is slightly less than 0 volts. A D.C. voltage, therefore, appears on the output side of diode 65, and this is chopped by the chopper, producing a suitable square wave form, then amplified, then rectified by the diode pump circuit and then further amplified to drive the electromagnet in order to move the arc lamp housing.

With no square wave input, minus 6 volts appears undiminished on the control grid of power amplifier tube 80 and there is then no output to the electromagnet. On the other hand, when the square wave appears, then the power amplifier grid voltage becomes less negative, and the power amplifier tube provides an output to operate the electromagnet.

When proper regulation occurs, the entrance slit 24 of the monochromator will have the image 81 of the arc almost but not quite centralized, there being a slight lack of alignment maintained at all times by the control. The result is that about 10% of the light is cut off by the side of the slit as compared to a perfectly centralized condition.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an optical mechanism, a source of light producing a light beam, an optical system including a monochromator receiving the light beam from said source of light and transmitting an exit light beam, a beam splitter interposed in the path of said exit light beam after it passes through the monochromator and producing a subsidiary light beam responsive to the light beam passing through the monochromator, photomultiplier means responsive to said subsidiary light beam and producing an electrical output, means for providing a reference voltage, means for comparing said electrical output of said photomultiplier means with said reference voltage, and electrical means for moving the source of light with respect to the input to the monochromator for maintaining the exit light flux constant, said means being responsive to the difference between said reference voltage and said electrical output of the photomultiplier means.

2. In an optical system, a source of light producing a light beam, an optical device including a monochromator receiving said light beam from said source as an input light beam and producing an exit light beam, a beam splitter interposed in the path of said exit light beam beyond the monochromator and producing a subsidiary light beam, photomultiplier means receiving and responsive to said subsidiary light beam and producing an electrical output therefrom, means for producing a reference voltage, means for comparing said electrical output of the photomultiplier means with said reference voltage, and solenoid means responsive to the difference between said reference voltage and said electrical output of the photomultiplier for manipulating the source of light to maintain the light flux of the exit beam from the monochromator constant.

3. In an optical system, an arc lamp producing a light beam, optical means including a monochromator receiving the light beam from said arc lamp as an input light beam and producing an exit light beam, a beam splitter interposed in the path of said exit light beam beyond said monochromator and producing a subsidiary light beam, photomultiplier means receiving said subsidiary light beam and producing an electrical output responsive thereto, means for providing a reference D.C. voltage, means for comparing the electrical output of said photomultiplier means with said reference D.C. voltage, means for amplifying the difference between the reference D.C. voltage and the electrical output of the photomultiplier, and solenoid means operatively connected to said arc lamp to manipulate the same and maintain the light flux in said exit beam constant, said solenoid means operating in response to the output of said means for amplifying.

References Cited by the Examiner

UNITED STATES PATENTS

| | | | |
|---|---|---|---|
| 2,662,991 | 12/53 | Gretener | 250—217 X |
| 2,744,439 | 5/56 | Hill | 88—14 |
| 2,837,959 | 6/58 | Saunderson et al. | 88—14 |

JEWELL H. PEDERSEN, *Primary Examiner.*